Oct. 9, 1923.

G. KIRKEGAARD 1,469,926

LENS GROOVING MACHINE

Filed May 5, 1919   2 Sheets-Sheet 1

INVENTOR
Georg Kirkegaard
BY
E. W. Marshall
ATTORNEY

Oct. 9, 1923. 1,469,926
G. KIRKEGAARD
LENS GROOVING MACHINE
Filed May 5, 1919 2 Sheets-Sheet 2
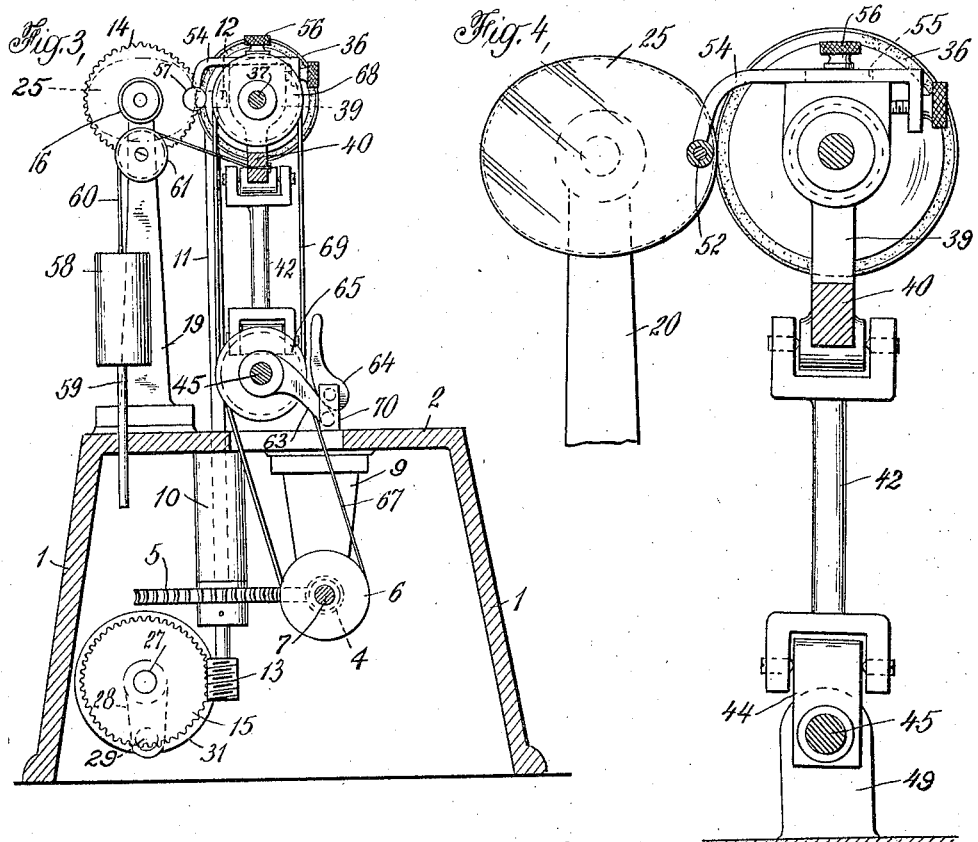
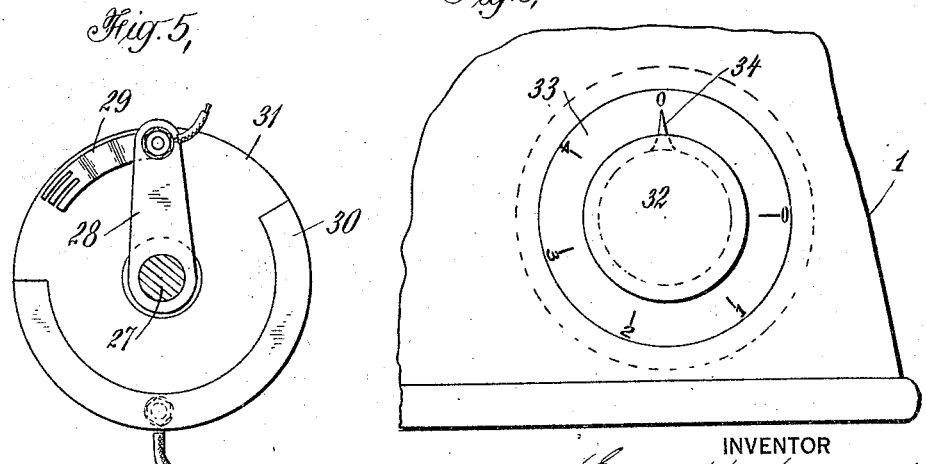
INVENTOR
Georg Kirkegaard
BY
E. W. Marshall
ATTORNEY Patented Oct. 9, 1923.

1,469,926

UNITED STATES PATENT OFFICE.

GEORG KIRKEGAARD, OF BROOKLYN, NEW YORK, ASSIGNOR TO INTER-STATE OPTICAL CORPORATION, OF BROOKLYN, NEW YORK, A CORPORATION OF NEW YORK.

LENS-GROOVING MACHINE.

Application filed May 5, 1919. Serial No. 294,892.

*To all whom it may concern:*

Be it known that I, GEORG KIRKEGAARD, a citizen of the United States, and a resident of Brooklyn, Kings County, and State of New York, have invented certain new and useful Improvements in Lens-Grooving Machines, of which the following is a specification, reference being had to the accompanying drawings, forming a part thereof.

This invention relates to improvements in a machine for automatically grooving lenses.

Heretofore in machines of this character in order to obtain a yielding movement to permit the cutter to follow the surface and contour of the glass, it has been necessary to have in addition to a pivoted frame, a shaft slidably mounted.

One object of this invention is to provide a machine which permits the cutter to automatically follow the glass surface and contour without the necessity of having a longitudinally slidable shaft.

A further object is to provide a manually adjustable means which automatically controls the driving means so that the cutter may be stopped after a predetermined number of revolutions of the glass. This control feature is a very desirable one in that by its use it enables one attendant to operate a number of machines.

Another object is to provide a novel method of driving the cutting member which is movable in two horizontal directions, without producing slack in the driving means.

Still another object is to provide a construction in which the axis of the cutting tool is at all times maintained parallel to the axis on which the lens is being turned, and this without the necessity of using a shaft slidably mounted.

In order that my invention may be thoroughly understood I will now proceed to describe the same in the following specification, and will then point out the novel features thereof in appended claims.

Referring to the drawings:

Figure 3 is an end elevation of Figure 2, partly in section, taken on the line 3—3 and looking in the direction of the arrows.

Figure 4 is a detail view showing more clearly the manually adjustable means for positioning the cutter with respect to the glass and the arrangement of the pivoted standard and supports therefor.

Figure 5 is a more detailed view of the travelling arm and contact for the control circuit of the motor.

Figure 6 is a view showing the indicator for adjusting the machine for a predetermined cutting period.

Figure 1:
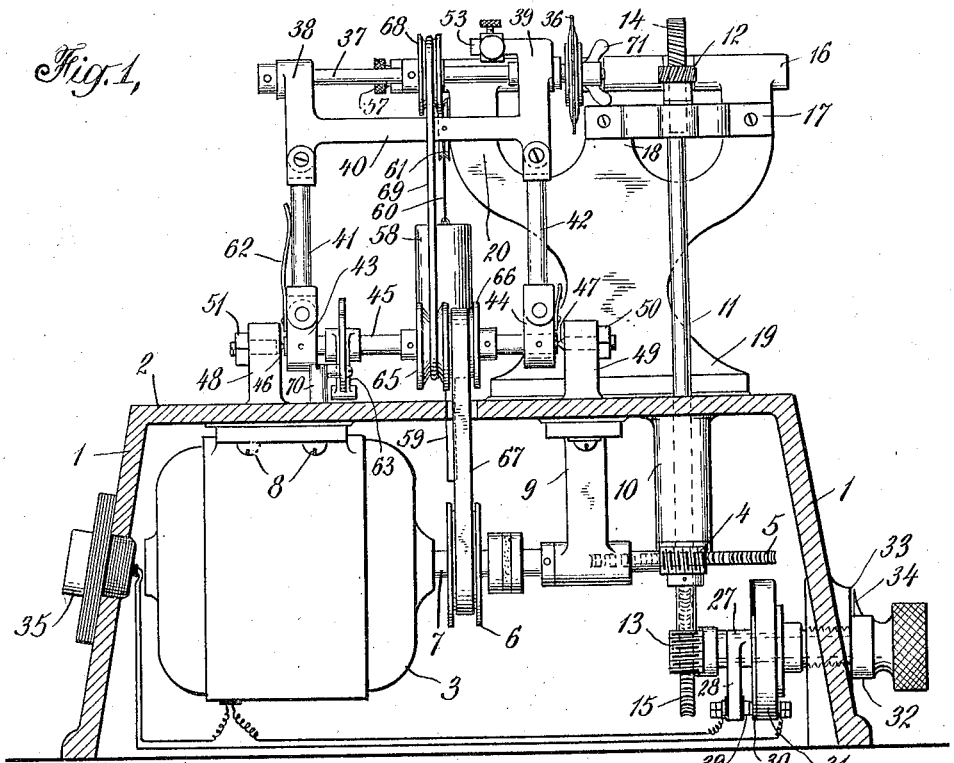
Figure 1 is an elevation view of a machine, partly in section, embodying the invention.
Figure 2:
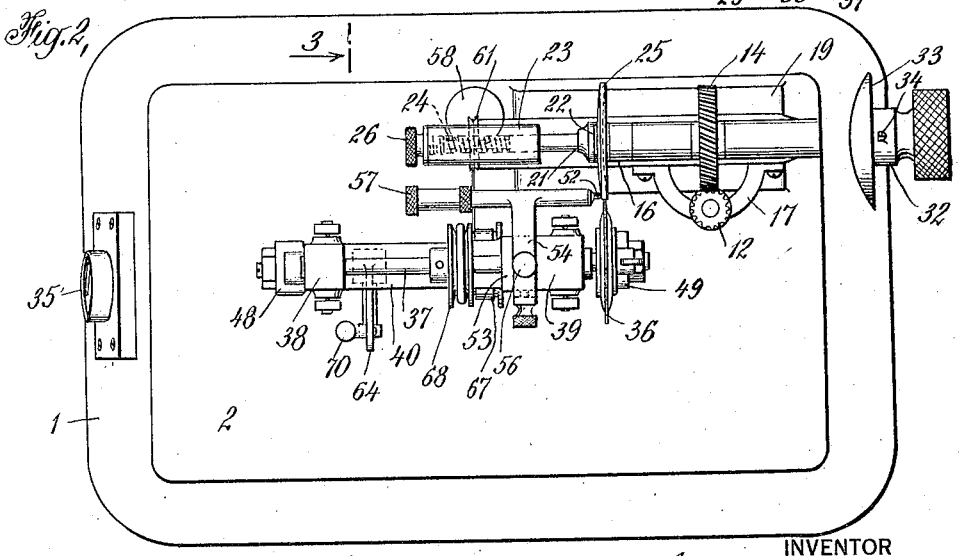
Figure 2 is a plan view of Figure 1.

The base of the machine comprises the sides 1 and the top 2 forming a substantially enclosed structure in which is arranged a motor 3 and suitable driving means including a worm gear connection 4, 5 and a pulley 6, driven through the shaft 7 of the motor, the motor being suitably supported from the top 2 by bolts 8, and shaft and gearing by the brackets 9, 10. A vertical shaft 11 is driven by the gear 5 and has a worm mounted on each end 12, 13, each worm in turn engaging worm gears 14 and 15 respectively. The worm gear 14 is mounted on a shaft 16 journaled in arms 17, 18 of a rigid support 19 mounted on the top 2. A third arm 20 of the support 19 serves to hold a plunger 21 having a head 22 in alignment with shaft 16, the plunger 21 being rotatably carried in the housing 23 which has a spring 24 therein tending to push the plunger toward the shaft 16. The lens 25 is placed between the plunger head 22 and the end of shaft 16, and is rotatably carried there-between. A screw 26 is provided for the end of housing 23 to adjust the spring pressure.

The gear 15 is mounted on a shaft 27 which carries an arm 28 having a contact 29 thereon which travels over a contact segment 30 carried by the adjustable block 31 which in turn may be rotated manually by the indicator 32 to the desired position which will depend upon the time of the grooving operation or the number of turns of the lens. An indicating scale 33 is provided on the face of one of the sides 1 where the indicator 32 passes therethrough, so that the pointer 34 of the indicator 32 may be moved to desired position. On the opposite side of the base is mounted a socket 35, which is connected in series with the motor 3 and indicator contacts 29 and 30, and from which power may be taken. It is apparent that the indicator may be set at the desired point and after the motor has operated for a sufficient period it will be automatically stopped, the indicator and its cooperating parts thus functioning as an automatic stop. It is this feature that readily enables one operator to tend to a number of machines.

The cutting tool 36 is carried on one end of a shaft 37 having bearings 38, 39. An arm 40 connects the two bearings and is pivotally supported at each end by two standards 41, 42 which standards in turn have their lower ends pivotally supported in blocks 43, 44 carried rigidly on each end of a shaft 45. It is to be noted however, that the pivotal connections between these blocks and the arm 40 will only permit a parallel movement of the cutting tool axially with respect to the shaft 16 rotating the lens 25. The shaft 45 is supported at each end by cones 46—47 adjustably carried in blocks 48, 49 rigid on the top 2 of the base. Nuts 50, 51 are provided for adjusting the cones 46—47 for the bearing of shaft 45. It is to be noted that by mounting the shaft in this manner, that a pivotal movement of the cutting tool is provided which is at right angles to the above mentioned pivotal movement and so will thus permit it to move radially with respect to the rotating lens. This latter movement will enable the grinder to follow the periphery of the lens while the former axial movement will enable the grinder to follow the change of surface contour of the lens. An abutment 52 is adjustably carried on an arm 53 rigid with the bearing 39 by the sliding arm 54. A slot 55 and screw 56 is provided for adjusting the movement radially and a threaded screw connection is governed by the knurled nut 57 at the end of abutment for adjusting the abutment axially. It is apparent that the abutment rides over the surface contour of the lens and thus maintains a fixed relation with the cutter, thus keeping it parallel with the lens. A weight 58 on a guide 59 is connected to the arm 40 by the connection 60 which is carried over a guide pulley 61. This tends to move the grinder radially and keeps it in yielding engagement with the rim of the lens.

A spring 62 is carried by the block 43 and engages the standard 41, tending to move the grinder axially, thus causing the abutment to follow the surface of the lens and to guide the grinder accordingly.

An arm 63, rigid with the shaft 45, is provided to engage a cam 64 carried by post 70 on the top 2, when it is desired to move the grinder to an inoperative position.

On the shaft 45 are rotatably mounted pulleys 65, 66 the pulley 66 being driven from the pulley 6 by a belt 67, and the pulley 66 in turn driving the grinder 36 through pulley 68 through the belt 69 and pulley 65 which turns with pulley 66. By this method of belting to drive the grinder it is to be noted that neither the axial or radial movement of the grinder causes slack in the driving belts. This is obviated by having a driving pulley at the axis of the pivotal movement of the grinder.

A very desirable feature of this construction is the facility with which the grinder may be removed. This is done by merely loosening the wing nut 71 on shaft 37.

While I have described but one preferred form of my invention, changes and modifications may be made therein without departing from the spirit and scope of this invention.

What I claim is:

1. In a machine for grooving lenses, a fixed support in which a lens may be rotatably mounted, a cutter for grooving the lens, means supporting said cutter, said means including a support pivoted to permit movement of the cutter radially of the lens, an arm, a shaft journaled therein to carry said cutter, and a plurality of standards, one end of each being pivotally connected to separated points on said arm and the other ends of each being pivotally connected to said support at separated points whereby said shaft has axial movement parallel with the axis of the lens.

2. In a machine for grooving lenses, a fixed support in which a lens may be rotatably mounted, a cutter for grooving the lens, means supporting said cutter, said means including a support pivoted to permit movement of the cutter radially of the lens, an arm, a shaft journaled therein to carry said cutter, a plurality of standards, one end of each being pivotally connected to separated points on said arm and the other ends of each being pivotally connected to said support at separated points whereby said shaft has axial movement parallel with the axis of the lens, and means for driving said cutter arranged to maintain a uniform driving effort irrespective of the position of said cutter.

3. In a machine for grooving lenses, a fixed support in which a lens may be rotatably mounted, a cutter for grooving the lens, means supporting said cutter, said means including a support pivoted to permit movement of the cutter radially of the lens, an arm, a shaft journaled therein to carry said cutter, a plurality of standards, one end of each being pivotally connected to separated points on said arm and the other ends of each being pivotally connected to said support at separated points whereby said shaft has axial movement parallel with the axis of the lens, and means for driving said cutter arranged to maintain a uniform driving effort irrespective of the position of said cutter, said means including a pulley mounted on the cutter shaft, another pulley at the axis of said support and a belt connecting said pulleys.

4. A machine for grooving lenses comprising a support in which a lens may be rotatably mounted, a rotary cutter, a shaft therefor, an adjustable abutment cooperating with the face of the lens to position the cutter with respect thereto, and movable means for supporting said shaft arranged to maintain parallelism between said shaft and the axis of said lens when moved axially, said means including a shaft pivotally mounted to permit limited rotative movement radially of the lens, standards pivotally mounted with respect of said said shaft to permit movement in a plane normal to the rotary movement of said shaft, an arm pivotally supported by said standards, bearings carried by said arm for the cutter shaft, means including a weight for holding said cutter in yielding engagement with the edge of the lens, and means for maintaining said abutment in operative engagement with said lens.

5. In a machine for grooving lenses, a fixed support in which a lens may be rotatably mounted, a cutter for grooving the lens, a shaft therefor, a support for the shaft pivotally mounted to permit movement axially and radially of the lens to maintain the axis of the cutter parallel with the axis of the lens, said support comprising a frame having two sets of parallel members normal to each other with their ends pivotally connected.

6. In a machine for grooving lenses, a motor, a circuit therefor, a fixed support in which a lens may be rotatably mounted, a movable support having a cutter rotatably mounted, independent driving means for said lens and said cutter actuated by said motor, manually adjustable means for setting said machine for a predetermined period of operation, means for automatically interrupting said motor circuit after a predetermined period of operation, said means including a contact connected to be driven by one of the driving means and a contact having an index and a graduated scale cooperating therewith.

7. In a machine for grinding a lens, a fixed support in which a lens may be rotatably mounted, a shaft, a rotating tool therefor, and supporting means, for said shaft movable parallel with the axis of said lens, an adjustable abutment in fixed relation with said tool and cooperating with said lens to position said tool with respect thereto, means for yieldingly engaging said tool with the periphery of said lens, a motor for rotating said tool and lens, and means for varying the operative period of said motor.

8. In a machine for grinding a lens, a fixed support in which a lens may be rotatably mounted, a shaft, a rotating tool therefor, and supporting means for said shaft movable parallel with the axis of said lens, an adjustable abutment in fixed relation with said tool and cooperating with said lens to position said tool with respect thereto, means for yieldingly engaging said tool with the periphery of said lens, a motor for rotating said tool and lens, a motor circuit, manual means for closing said circuit and automatic means for opening the motor circuit after a predetermined grinding period.

In witness whereof, I have hereunto set my hand this 2nd day of May, 1919.

GEORG KIRKEGAARD.

In presence of—
MAX SIEGEL.